United States Patent [19]

Minatogawa et al.

[11] Patent Number: 5,673,429
[45] Date of Patent: Sep. 30, 1997

[54] DATABASE DISPLAY SYSTEM USING LIST MANAGEMENT OF DISPLAY FORMATS

[75] Inventors: Masamitsu Minatogawa, Yatsumachi; Maki Sakuta, Kawasaki; Masayuki Shibano, Yaysuomachi, all of Japan

[73] Assignee: Fujitsu Limited, Kawasaki, Japan

[21] Appl. No.: 509,012

[22] Filed: Jul. 31, 1995

[30] Foreign Application Priority Data

Feb. 12, 1994 [JP] Japan .................................. 6-299426

[51] Int. Cl.$^6$ .................................................. G06F 17/30
[52] U.S. Cl. ........................... 395/611; 395/326; 395/604
[58] Field of Search .............................. 395/611, 326, 395/604

[56] References Cited

U.S. PATENT DOCUMENTS

| | | | |
|---|---|---|---|
| 5,088,052 | 2/1992 | Spielman et al. | 395/346 |
| 5,097,408 | 3/1992 | Huber | 395/604 |
| 5,121,477 | 6/1992 | Koopmans et al. | 395/333 |
| 5,220,675 | 6/1993 | Padawer et al. | 395/800 |
| 5,412,774 | 5/1995 | Agrawal et al. | 395/340 |
| 5,444,842 | 8/1995 | Bentson et al. | 395/357 |
| 5,475,833 | 12/1995 | Dauerer et al. | 395/617 |
| 5,566,330 | 10/1996 | Sheffield | 395/604 |
| 5,596,702 | 1/1997 | Stucka et al. | 395/340 |

Primary Examiner—Wayne Amsbury
Attorney, Agent, or Firm—Staas & Halsey

[57] ABSTRACT

A database display system is provided which makes it unnecessary for the user to remember each of the names or locations of display formats in cases where a plurality of display formats are associated with a database. An external storage holds, in addition to a data section for storing instance groups, a management section in which a plurality of display formats are collectively stored. A display format list displaying unit displays the display formats stored in the management section in the form of a list to permit a desired display format to be selected and specified, and the display conditions of the specified display format are analyzed by a display format analyzing unit. When instances are read from the data section by instance read-in means, they are edited in memory means according to the analyzed display format, and a list of the edited instances is displayed by a display unit.

7 Claims, 8 Drawing Sheets

| LIST FORMAT | | |
|---|---|---|
| ITEM 1 | ITEM 2 | ITEM 3 |
| INSTANCE A | INSTANCE D | INSTANCE G |
| INSTANCE B | INSTANCE E | INSTANCE H |
| INSTANCE C | INSTANCE F | INSTANCE I |
| . | . | . |
| . | . | . |
| . | . | . |

| SCRAPBOOK | |
|---|---|
| ITEM 1 : | INSTANCE A |
| ITEM 2 : | INSTANCE D |
| ITEM 3 : | INSTANCE G |
| ITEM 1 : | INSTANCE B |
| ITEM 2 : | INSTANCE E |
| ITEM 3 : | INSTANCE H |
| ITEM 1 : | INSTANCE C |
| ITEM 2 : | INSTANCE F |
| ITEM 3 : | INSTANCE I |

FIG. 6

DATABASE DISPLAY SYSTEM USING LIST MANAGEMENT OF DISPLAY FORMATS

BACKGROUND OF THE INVENTION (1) Field of the Invention

The present invention relates to a database display system, and more particularly, to a database display system designed for unified management of a plurality of display formats according to which the contents of databases are displayed.

(2) Description of the Related Art

To display data collected in a database, a display format meeting the display needs is usually prepared and data items retrieved from the database are rearranged and displayed according to the display format.

In a conventional database, the name or location of the database is recorded as part of the display format for displaying substantive part of the database, as seen from display field defining body. Namely, when displaying the contents of a certain database, a display format defining, for example, the items and their positions to be displayed on the display screen, is created, and at this time, the name or location of the database is also defined in the display format.

In the case where a plurality of display formats, such as list-format interactive screen and card-format interactive screen, are prepared for an identical database and are switched during operation, such display formats bear a linking relationship therebetween.

To display the contents of the database, first, a desired display format is selected and specified or is directly specified during operation. Since the name or location of the database is recorded in the display format, the database as a target storage holding data to be displayed is identified by the recorded name or location, and instances of substantive part corresponding to the items defined in the display format are retrieved from the database and then displayed on screen according to the layout defined in the display format.

However, where a database has a plurality of display formats associated therewith, the user must remember each of the names or locations of the display formats.

Also, in cases where a linking relationship is to be held between display formats, if the number of linked display formats is increased, then the organization of linking relationships becomes complicated, making it impossible in practice to associate a large number of display formats with the database.

SUMMARY OF THE INVENTION

It is an object of the present invention to provide a database display system which makes it unnecessary for the user to remember the names or locations of display formats and which is capable of unified management of a plurality of display formats associated with a database.

To achieve the above object, a database display system according to the present invention comprises storage means holding a database which includes a data section storing groups of instances and a management section storing all of a plurality of display formats, display format list displaying means for displaying all of the display formats stored in the management section in a list form, to permit a desired display format to be selected and specified, display format analyzing means for retrieving the display format specified by the display format list displaying means from the management section and analyzing display conditions of the retrieved display format, instance read-in means for reading instances required by the specified display format from the data section, memory means for generating a list of the read instances edited according to the specified display format, and display means for displaying the list of the instances and a list of all of the display formats stored in the management section.

The above and other objects, features and advantages of the present invention will become apparent from the following description when taken in conjunction with the accompanying drawings which illustrate preferred embodiment of the present invention by way of example.

BRIEF DESCRIPTION OF THE DRAWINGS

FIG. 3 is a diagram showing an example of a list format screen;

FIG. 6 is a diagram showing an example of a scrapbook screen;

DESCRIPTION OF THE PREFERRED EMBODIMENT

An embodiment according to the present invention will be hereinafter described with reference to the drawings.

Figure 1:
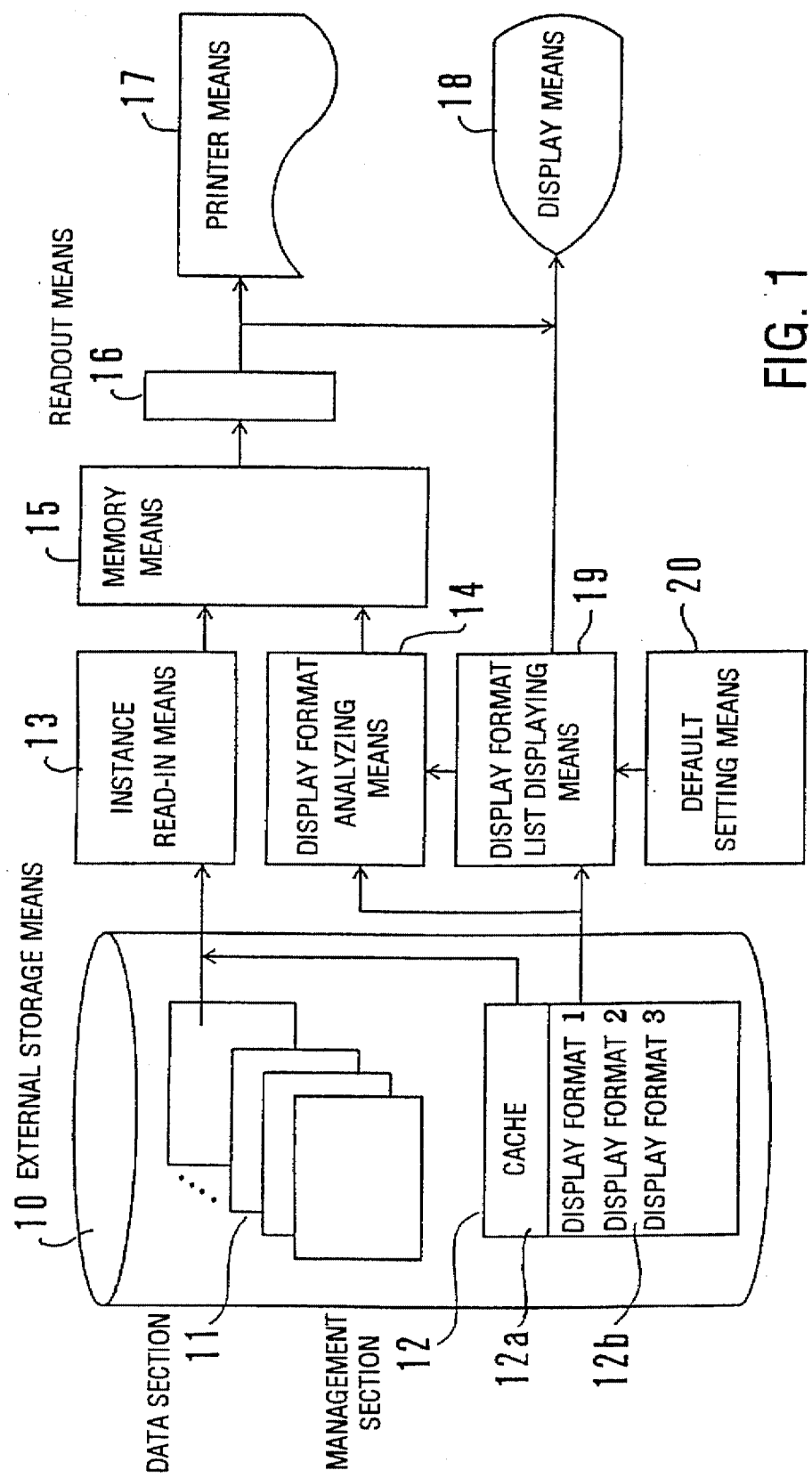
FIG. 1 is a diagram showing an example of the configuration of a database display system according to the present invention.

FIG. 1 illustrates an example of the configuration of a database display system according to the present invention. As illustrated, the database display system has external storage means 10 which stores one or more databases comprising a data section 11 and a single management section 12.

The external storage means 10 is connected to instance read-in means 13 and display format analyzing means 14, the outputs of which are connected to memory means 15. The output of the memory means 15 is connected via readout means 16 to printer means 17 and display means 18. The external storage means 10 is also connected to display format list displaying means 19, the output of which is connected to the display format analyzing means 14 and the display means 18. To the display format list displaying means 19 is connected default setting means 20 for setting a default display format.

The data section 11 in the external storage means 10 comprises one or more objects which may, for example, be document files containing instances forming substantive part of a database. The document files may be those written in a language for describing document structure and other attributes, for example, SGML (Standard Generalized Markup Language). In an SGML document, significant character strings in the document are each affixed with a tag. In this example, a tag is affixed to a substantive part of the database, and when reading instances of the database, the instance read-in means 13 searches for and retrieves character strings affixed with specific tags in such SGML document.

The management section 12 comprises a cache area 12a and a display format storage area 12b. The cache area 12a is an area for storing only data relating to the instances retrieved from the data section 11. When reading instances, the instance read-in means 13 reads the instances not from the data section 11, but from the cache area 12a; therefore, the file has only to be opened and closed once each, making it possible to speed up the reading and display of instances according to a specified display format. The display format storage area 12b is an area in which all display formats associated with the database are defined, and stores the names and contents of the individual display formats defined therein. The contents of a display format include display conditions such as elements to be displayed, display order of the elements, on-screen display positions of the elements, maximum numbers of characters that can be displayed for the respective elements, and character layouts at the respective on-screen display positions.

When instances of the database are displayed, a default display format set by the default setting means 20 is set and selected in the display format list displaying means 19 unless any other particular format is specified. The name of the selected display format is notified to the display format analyzing means 14. Based on the name of the display format thus notified, the display format analyzing means 14 reads the contents of the display format in question from the management section 12. The display format analyzing means 14 then analyzes the contents of the display conditions of the read display format, for example, the names of elements, layouts of the elements and maximum numbers of characters to be displayed, as well as character layouts such as left-aligning or centering of character strings, and loads data relating to the display format into the memory means 15.

After the data relating to the display format is loaded in memory, the instance read-in means 13 retrieves required instances from the data section 11 of the external storage means 10 and then merges the retrieved data with the display format data in the memory means 15. Alternatively, the read instances are processed and edited, taking the display format into account, to obtain data to be displayed or printed. The data is read out of the memory means 15 by the data readout means 16, and then is printed by the printer means 17 or displayed by the display means 18.

If, in this case, a command to display a list of display formats is issued while data is displayed according to the default display format, the display format list displaying means 19 is started and the names of all of the recorded display formats are displayed in list form on the screen of the display means 18. When a different display format is selected from the list of display format names, the name of the selected display format is notified to the display format analyzing means 14, which then reads the contents of the display format in question from the display format storage area 12b of the management section 12 on the basis of the display format name notified thereto and processes the instances according to the display format. In this processing, if the instances read first can be used, they are processed according to the selected display format; if not, the instance read-in means 13 again reads the instances. In this case, the instance read-in means 13 preferably reads the instances from the cache area 12a of the management section 12, instead of directly reading the substantive part.

While the instances of the database are displayed according to a certain display format in this manner, a different display format can be selected at any time by starting the display format list displaying means 19, whereupon the instances are reformatted and displayed according to the selected display format.

Figure 2:
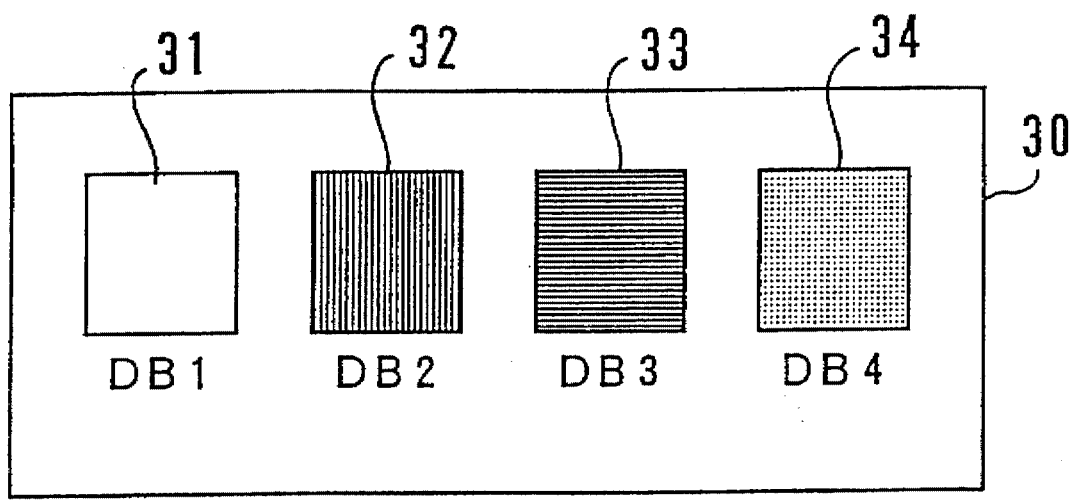
FIG. 2 is a diagram showing an example of a database list screen.

FIG. 2 illustrates an example of a screen showing a database list. In the illustrated example, icons 31, 32, 33 and 34 respectively representing four databases are displayed on a database list screen 30, and database names "DB1", "DB2", "DB3" and "DB4" are shown below the respective icons. To select a desired database from those displayed on the database list screen 30, a mouse is used, for example. Namely, the mouse cursor is moved to the icon of a desired database and then the mouse is double-clicked.

It is here assumed that the database named "DB2" is selected and that three display formats, that is, list format, card format and scrapbook, are recorded in association with this database. It is also assumed that the list format is set as the default display format. Accordingly, when the icon of the database "DB2" is specified and selected from the database list screen 30 and data display is commanded, the contents of the database "DB2" are displayed using the list format as the display format.

FIG. 3 illustrates an example of a list format screen. In the illustrated example, the display format recorded in the name of the list format specifies display conditions that three items of the database, that is, "Item 1", "Item 2" and "Item 3", be shown in a row on a list format display screen 40 and that individual objects, that is, the contents of the corresponding items in individual documents, be displayed in the subsequent lines below the respective items. For example, "Instance A", "Instance D" and "Instance G" are shown as the contents of the corresponding items of the first object.

When database display is merely instructed in this manner, the contents of the database are displayed according to the display format determined by default setting. The display format can be changed as needed by selecting, for example, "List of Display Formats" from a menu, not shown. When "List of Display Formats" is selected, a pull-down menu, for example, appears which shows all of the names of the display formats associated with the database concerned in the form of a list.

Figure 4:
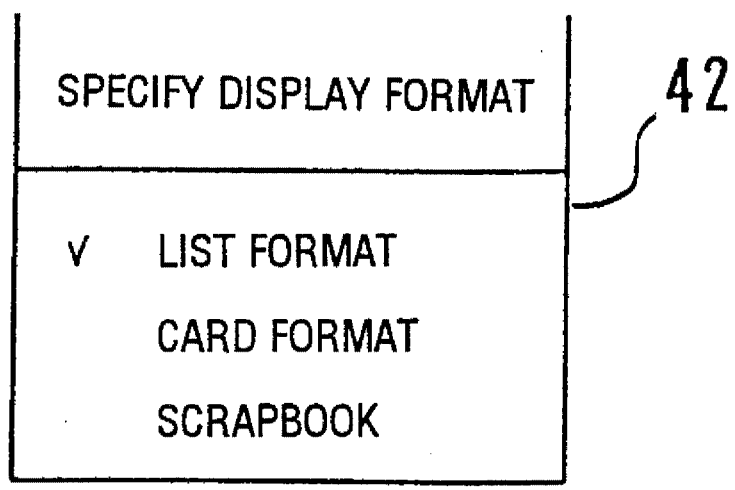
FIG. 4 is a diagram showing an example of a screen indicating a list of display formats recorded in a database.

FIG. 4 illustrates an example of a list of display formats recorded in association with the database. As illustrated, a pull-down menu 42 shows all of the names of the display formats recorded in association with the database, that is, "List Format", "Card Format" and "Scrapbook". Among the display format names listed in the pull-down menu 42, the check mark "✓" appears to the left of the "List Format", and this means that the currently used display format is the list format. Although in the illustrated example, the list of the display formats is shown in the pull-down menu 42, it may be shown in a window such as a pop-up menu or a dialog box.

If the mouse is clicked with the mouse cursor positioned on the name of another display format, for example, "Card Format", then change of the display format to the "Card Format" is instructed. As a result, the contents of the database are displayed on screen according to the card format.

Figure 5:
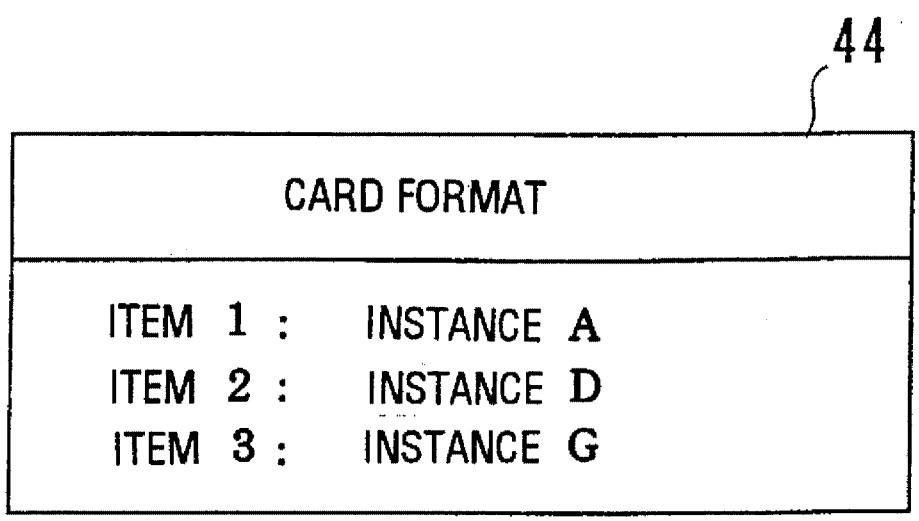
FIG. 5 is a diagram showing an example of a card format screen.

FIG. 5 illustrates an example of a card format screen. In the illustrated example, the card format as the display format specifies display conditions that the three items "Item 1", "Item 2" and "Item 3" of the database be arranged vertically on a card format display screen 44 and that the contents of the items in one object be shown next to the corresponding items.

Whichever display format is being used to display the contents of the database, the list of the display formats can be displayed through operation of the mouse, for example, and thus the display format can be changed at any time.

FIG. 6 illustrates an example of a scrapbook screen. In the scrapbook mode as the display format, a scrapbook display screen 46 is shown wherein card format screens are chained vertically. While the card format screen shows the contents of one object, the scrapbook screen can simultaneously display the contents of a plurality of objects like the list format screen.

Figure 7:
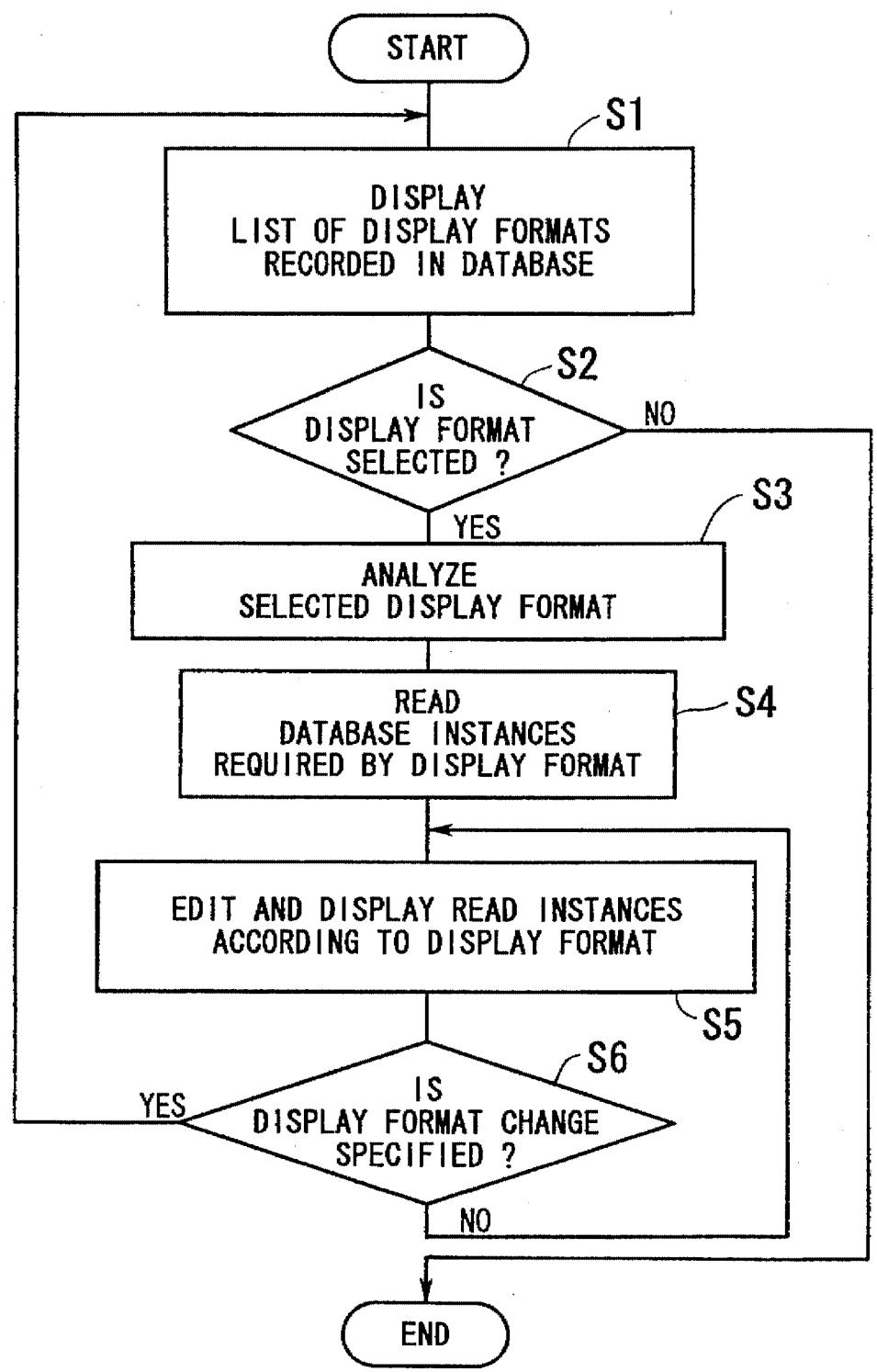
FIG. 7 is a flow chart illustrating the operation executed when a display format is selected.

FIG. 7 is a flow chart of the operation executed when a display format is selected. The illustrated process is started when a command to display the list of display formats is issued while the contents of the database are displayed according to the default display format.

First, the list of the display formats recorded in association with the database is shown in the pull-down menu (Step S1. It is then determined whether any one of the display format names listed in the pull-down menu has been selected (Step S2). If it is judged in Step S2 that none of the display format names has been selected, the process is ended; if it is judged in Step S2 that any one of the display format names has been selected, the contents, or the display conditions, of the display format identified by the selected display format name are analyzed (Step S3). In cases where the selected display format name is not associated with the contents of the display format, display conditions are retrieved from a table (e.g., the management section 12 in FIG. 1) in which the contents of display formats and their corresponding display format names are stored according to the display format names, and the retrieved display conditions are analyzed.

The items of the database required by the selected display format can be identified by analyzing the display conditions; therefore, the instances corresponding to the items are read from the database (Step S4). Subsequently, the read instances are edited and displayed according to the display format (Step S5). Specifically, in accordance with the result of the analysis, the instances are rearranged in the display order of the items, and if the character layout of an instance differs from that determined by a prescribed value, for example, if a character string must be right-aligned, such character string is processed so as to be aligned to the right in the corresponding display field, the processed data being displayed. It is thereafter determined whether a change of the display format has been commanded (Step S6). If a command to change the display format is issued, the process returns to Step S1 in which the display format list is displayed, and if not, the process returns to Step S5 in which the read instances are edited and displayed according to the display format.

Figure 8:
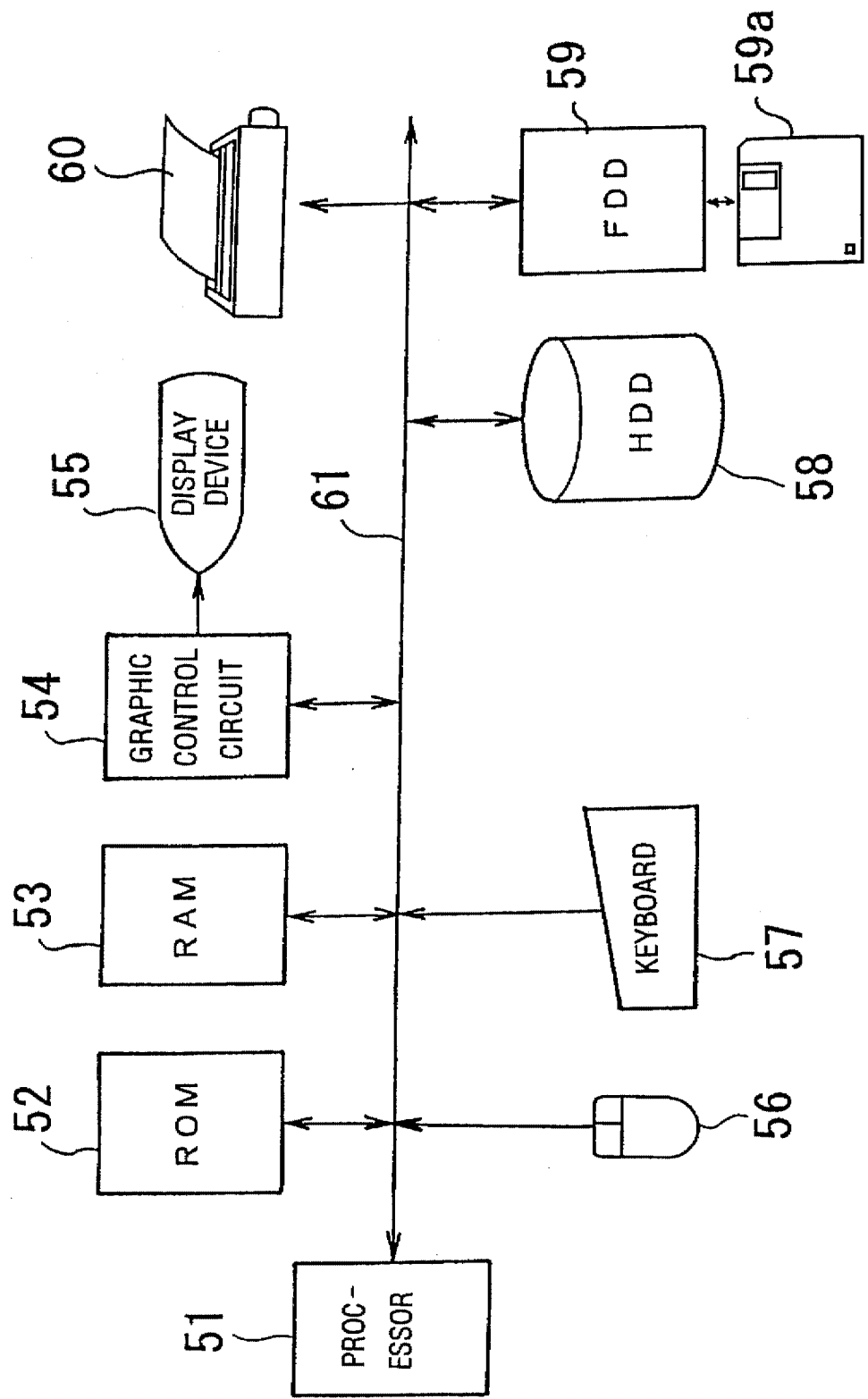
FIG. 8 is a diagram showing an example of the hardware configuration of a computer system for carrying out the present invention.

FIG. 8 illustrates an example of the hardware configuration of a computer system for carrying out the present invention. In FIG. 8, the computer system comprises a processor 51, a read-only memory (ROM) 52, a main memory (RAM) 53, a graphic control circuit 54 connected to a display device 55, a mouse 56, a keyboard 57, a hard disk drive (HDD) 58, a floppy disk drive (FDD) 59, and a printer 60, and these elements are interconnected by a bus 61.

The processor 51 globally controls the entire computer system. The read-only memory 52 stores, for example, programs necessary for starting the system. In the main memory 53 are loaded a system program and an application program for display format management; also the main memory 53 stores data such as the selected display format, read instances and the like.

The graphic control circuit 54 includes a video memory etc., and converts, for example, a list screen of the specified display format, which is a combination of the display format and instances read in the main memory 53, to display signals, which are then supplied to the display device 55. In accordance with the input display signals, the display device 55 displays a list of the instances in the list format, for example, on the screen thereof.

The mouse 56 is a pointing device for moving the cursor displayed on the screen of the display device 55. Clicking a button of the mouse displays the pull-down menu for specifying a display format, or permits a desired one of the display formats listed in the menu to be selected and specified. The keyboard 57 is used to enter characters etc. when the display formats are created, edited, or recorded.

The hard disk drive 58 stores the system program, the application program for the display format management of databases, document files containing groups of instances of the databases, management files for the display format management, etc. The floppy disk drive 59 is an external storage device which permits document files stored on a floppy disk 59a to be transferred to the hard disk drive 58 or the data listed according to a specified display format, for example, to be recorded on the floppy disk 59a.

Display data representing the list of instances according to a specified display format can be sent to the printer 60 so that the list may be printed on paper.

As described above, according to the present invention, the display formats according to which the contents of a database associated therewith are displayed are recorded as part of the database. This permits unified management of various display formats associated with the database, thus making it unnecessary for the user to remember the locations of the display formats.

Accordingly, the user has only to learn the name or location of a target database to display the contents of the same, saving the user's labor to manage a plurality of display formats.

Further, making a plurality of display formats associated with one database is equivalent to retaining a linking relationship between a plurality of display formats, which facilitates switching between a large number of display formats.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A database display system comprising:

storage means for holding a database which includes a data section for storing groups of instances and a management section for storing all of a plurality of display formats;

display format list displaying means for displaying all of the display formats stored in the management section in a list form, to permit a desired display format to be selected and specified;

display format analyzing means for retrieving the display format specified by said display format list displaying means from the management section, and analyzing display conditions of the retrieved display format;

instance read-in means for reading instances required by the specified display format from the data section;

memory means for generating a list of the read instances edited according to the specified display format; and display means for displaying the list of the instances and a list of all of the display formats stored in the management section.

2. The database display system according to claim 1, which further comprises default setting means for setting a default display format with respect to said display format list displaying means.

3. The database display system according to claim 1, wherein said data section comprises one or more files.

4. The database display system according to claim 1, wherein said data section comprises a document file as an object.

5. The database display system according to claim 4, wherein said document file comprises a file having document structure in which the instances are each affixed with a tag.

6. The database display system according to claim 5, wherein said management section includes a cache area for retrieving and storing the instances affixed with the tags.

7. The database display system according to claim 6, wherein said instance read-in means reads the instances from the cache area of the management section.

* * * * *

UNITED STATES PATENT AND TRADEMARK OFFICE
CERTIFICATE OF CORRECTION

PATENT NO. : 5,673,429
DATED : September 30, 1997
INVENTOR(S) : Masamitsu MINATOGAWA, et al.

It is certified that error appears in the above-indentified patent and that said Letters Patent is hereby corrected as shown below:

On the title page,

Item [75],  change "Yatsumachi" to --Yatsuomachi--;
 change "Yaysuomachi" to --Yatsuomachi--.

Item [56],  please insert the following Foreign Documents:
--JP-A-63-208937, filed August 30, 1988 in Japan,
JP-A-3-58170, filed March 13, 1994 in Japan,
JP-A-4-274560, filed September 30, 1992 in Japan,
JP-A-1-258127, filed October 16, 1989 in Japan.--

Signed and Sealed this

Second Day of December, 1997

*Attest:*

BRUCE LEHMAN

*Attesting Officer*     *Commissioner of Patents and Trademarks*